United States Patent Office 3,375,132
Patented Mar. 26, 1968

3,375,132
PROCESS FOR IMPREGNATING A CARBON
ELECTROLYTIC ANODE AND ARTICLE
Robert H. Geise, Tonawanda, N.Y., assignor to Union
Carbide Corporation, a corporation of New York
No Drawing. Filed Mar. 3, 1964, Ser. No. 349,137
12 Claims. (Cl. 117—228)

ABSTRACT OF THE DISCLOSURE

This invention relates to the impregnation of carbon electrodes with a thermosetting impregnant containing a tarry hydrocarbon, furfural and an acid catalyst.

---

This invention relates to an improved carbonaceous electrode for use in production of chlorine.

Chlorine is commonly manufactured by electrolytic decomposition of water-soluble alkali metal brine solutions. The brine solution is introduced into the anode compartment, where it comes into contact with the anodes and is caused to pass through a permeable diaphragm into a cathode compartment, where it comes into contact with the cathodes. When an electric current is passed between these electrodes chlorine gas is liberated at the anodes and an alkali metal hydroxide is formed at the cathodes with concomitant liberation of hydrogen gas.

The anodes employed in the above-described diaphragm cells are constructed of a carbonaceous material. Due to the porous nature of the shaped electrodes they tend to absorb the brine solution. Upon subsequent passage of an electric current chlorine and oxygen are liberated within the pores of the electrode thus causing oxidation of the carbonaceous material. Ultimately such electrodes deteriorate to the point of distintegration.

In the past, many synthetic and natural products, of both an organic and inorganic nature, have been employed in various impregnation techniques to increase the useful life of carbonaceous electrodes. The function of the impregnant is basically to prevent the formation of chlorine gas within the pores of the anode by excluding the brine solution from the interior of the electrode.

At present, linseed oil in combination with various drying agents is the most commonly used impregnant. Such use of linseed oil decreases the diffusion of the brine solution throughout the anode and generally provides increased life.

However, linseed oil is subject to certain inherent disadvantages. For example, the linseed oil may dry slowly and non-uniformly, due to the unavailability of oxygen in the inner areas of the electrode. Thus, occasionally electrodes are discovered wherein the oil is only partially dried or hardened. In such cases the unhardened linseed oil is leached out of the electrode and chlorinated. The chlorinated linseed oil contaiminates the brine bath, clogs the diaphragm causing reduced flow rates from cathode to anode, and consequent loss of efficiency. Furthermore, the presence of a non-conducting layer of linseed oil on the surface of the electrode will cause an undesirable increase in anode voltage and current consumption rate.

A general object of the invention is to provide improved impregnated carbonaeous electrodes such as are used as anodes in electrolytic chlorine producing cells.

A further object is to provide an impregnated anode which will resist attack by chlorine and oxygen.

A still further object is to provide an electrode having improved electrical characteristics.

A still further object is to provide an improved impregnated electrode which will not exude the impregnant and cause clogging of the diaphragm of the electrolysis cell.

Another object is to provide a process for increasing the useful life of carbonaceous anodes for use in electrolytic chlorine producing cells.

These and other related objects which are important to chlorine producers are achieved by providing a carbonaceous electrode which is impregnated with a cured compostion comprising furfuraldehyde, a tarry hydrocarbon and a catalyst capable of promoting a condensation reaction between the furfuraldehyde and the tarry hydrocarbon.

As used herein, including the appended claims, the term "tarry hydrocarbon" is intended to represent a composition of one or more compounds such as coal tar, coal tar pitch, petroleum pitch and derivatives of the constituents and fractions of such materials. The term "carbonaceous" is intended to include carbon and graphite.

In general, the impregnant comprises a liquid solution of furfuraldehyde containing from about 10 to about 80 weight percent tarry hydrocarbon and a catalytic amount of a suitable catalyst. Preferably the tarry hydrocarbon content is maintained between 40 and 60 weight percent.

The admixture comprising furfuraldehyde and a tarry hydrocarbon with the addition of a suitable catalyst have the properties of a thermosetting resin. When the admixture is used as an impregnant for carbonaceous electrodes and subsequently cured, electrodes evidencing superior service life and strength are obtained. Electrodes which have been impregnated with the curable compositions herein disclosed have been found to have increased mechanical strength when compared to conventional linseed oil treated electrodes. Flexural strengths have been increased from typical values of about 2200 pounds per square inch to substantially higher values of about 3400 pounds per square inch. This added strength adds to the structural stability of the electrode. Electrodes treated with the tarry hydrocarbon-furfural compositions herein disclosed have been found to remain rigid after the electrode has been worn to sections as thin as 25 millimeters. Electrodes impregnated with the cured compositions herein described have been found to have a cell life about 15 percent greater than linseed oil treated electrodes.

It has also been found that the start up voltage of tarry hydrocarbon-furfural treated anodes is from 0.1 to 0.2 volt lower than linseed oil treated anodes.

It has been observed that the formation of bubbles of chlorine on the tarry hydrocarbon-furfural treated anodes is quite different from the formation of such bubbles on linseed oil treated anodes. Chlorine bubbles tend to cling and accumulate into larger bubbles on the linseed oil treated anodes whereas the chlorine bubbles on tarry hydrocarbon-furfural treated anodes are small and are easily released by the surface.

With regard to the tarry hydrocarbon used in the present invention, these components should be essentially completely soluble in furfural at room temperature and contain no more than about 5 percent of materials which are insoluble in furfural, otherwise impregnation operations are adversely affected.

In addition to being soluble in furfural to provide an impregnant which is liquid at room temperature, the tarry hydrocarbon used preferably should have a melting point below about 110° C. and the tars should have a specific gravity not less than about 1.1.

The catalysts which are suitable to promote the condensation reaction between furfuraldehyde and the tarry hydrocarbon are selected from a broad group of acidic materials. Suitable catalytic materials include inorganic acids such as sulfuric acid, hydrochloric acid and phosphoric acid; carboxylic acids such as acetic acid, propanoic acid, butanoic acid; lauric acid, myristic acid, stearic acid, oxalic acid, malenic acid, succinic acid, maleic acid and the like; alkyl sulfonic acids such as methylsulfonic acid, propylsulfonic acid, isopropylsulfonic acid, ethane sulfonic acid, and the like; aromatic sulfonic acids such as benzene sulfonic acid, benzene disulfonic acid, toluene sulfonic acid, naphthalenedisulfonic acid, and the like.

Other suitable catalytic agents include organic acid anhydrides such as acetic anhydride, propionic anhydride, maleic anhydride, succinic anhydride, phthalic anhydride, benzoic anhydride, trimelletic anhydride, and the like; acid halides such as acetyl chloride, butyryl chloride, benzoyl chloride, benzene sulfonyl chloride, toluene sulfonyl chloride, and the like; alkyl sulfates such as dimethyl sulfate, diethyl sulfate, and the like; aromatic sulfonates such as sodium benzene sulfonate, and the like.

A preferred group of catalytic agents is the group of so-called latent catalysts. These materials develop their acid properties upon heating and provide polymerization at elevated temperatures but provide little or no polymerization at temperatures below room temperature. Illustrative latent catalysts include, diethyl sulfate, benzene sulfonyl chloride, toluene sulfonyl chloride, methyl toluene sulfonate trimelletic anhydride, succinic anhydride, phthalic anhydride, maleic anhydride, and the like.

The catalytic agents are employed in catalytic amounts, that is, in amounts sufficient to promote the condensation reaction at the desired rate. The quantity used should be sufficient to promote the desired degree of condensation within the period of time allocated to the curing of the impregnated electrode. The quantity employed should be sufficient to ultimately produce complete hardening of the furfuraldehyde-tarry hydrocarbon mixture. In general, the catalyst is employed in amounts ranging from 5 to 10 percent by weight of the furfuraldehyde-tarry hydrocarbon mixture. In situations where a slow or longer curing period is desired the catalyst can be used in amounts as small as 0.5 weight percent.

Improved carbonaceous electrodes are prepared in accordance with the present invention by introducing the impregnant solution, i.e., a catalyzed liquid solution of tarry hydrocarbon in furfuraldehyde into the pores of the electrode and subsequently curing the impregnated solution in situ. The impregnation is done according to conventional practice, for example, by using standard pressure-vacuum techniques and immersing the electrode in the tarry hydrocarbon containing solution of furfuraldehyde.

In general, the impregnated electrode may be prepared by degassing the electrode stock under vacuum. After the vacuum is applied the impregnant solution is introduced into the vessel. When the electrode is completely immersed in the impregnant solution the air pressure in the vessel is increased to a suitable level, e.g., about 150 pounds per square inch gauge, and maintained for a period of time to allow substantially complete impregnation.

After the pressure cycle, the impregnated electrode is allowed to drain and the surface is then washed with furfuraldehyde or some other suitable solvent. Washing the surface of the electrode provides a clean surface and thus lower start up voltage characteristics. Suitable solvents other than furfuraldehyde include benzene, toluene, naphthalene, and quinoline. In the event furfuraldehyde is used, the wash solution can be used to make up future impregnant solutions. Alternatively, mechanical cleaning methods can be employed.

The impregnated electrode can be cured under any suitable conditions of temperature and pressure required by the exigencies of the manufacturing operation. The impregnated electrode can be heated to thermoset, i.e., cure, the material in the pores. This heating should be carried out so as to minimize the loss of liquid by evaporation or exudation which may occur in the earlier stages of the heating while the material in the pores is still fluid. If the heating is carried out without the application of external pressure, as in an oven, the temperatures during the first four or five hours of heating should not exceed about 80 to 90° C. After the material in the pores has been at least partially thermoset by the heat treatment, higher temperatures may be used. When the heating is carried out under pressure, as in an autoclave, preliminary heating at lower temperatures is usually not necessary and higher temperatures can be used directly. Under most circumstances, when heating under pressures of about 100 p.s.i., satisfactory hardening of the material in the pores is obtained by heating at about 100° C. for 16 hours or at about 125° C. for 5 hours. The period of heating will, of course, vary somewhat depending upon the size of the article being treated.

A satisfactory curing cycle which provides a suitable improved electrode involved curing at atmospheric pressure for 24 hours at a temperature of about 150° C. Temperatures above the decomposition temperature of the impregnant should be avoided.

EXAMPLE

A quantity of impregnant was prepared by mixing equal amounts by weight of pitch and furfural to form a homogeneous solution. When the pitch had dissolved in the furfural 10 weight percent diethyl ethyl sulfate was added to the solution and intimately mixed therewith. The impregnant was then stored under refrigeration until used.

Electrolytic grade graphite anodes were prepared for use by degassing under vacuum in a suitable vessel. After the vacuum was applied the impregnant was introduced into the vessel in an amount sufficient to cover the anode. When the anode was covered, air pressure of 150 pounds per square inch gauge was applied and held for 45 minutes to insure proper impregnation.

After the pressure cycle the impregnated anode was allowed to drain and the surface was then washed with furfural. The impregnated anode was then cured at atmospheric pressure and a temperature of 150° C. for a period of 24 hours.

Following the procedure outlined above impregnated anodes were prepared in which p-toluene sulfonic acid and phthalic anhydride were employed to catalyze the polymerization reaction. In each case highly satisfactory impregnated anodes were produced.

It has also been found that the addition of about 10 weight percent of prepolymerized furfural alcohol to the furfural prior to being mixed with the tarry hydrocarbon allows a reduction in the amount of catalyst which is required. In such cases about 3 to 4 weight percent of the catalyst was found to be sufficient.

Impregnated anodes in which the concentration of tar or pitch in the impregnant ranged from 20 to 80 weight percent were prepared and evaluated.

It was found that the anode consumption is a function of the concentration of tarry hydrocarbon. In other words, as the percent of pitch or tar was increased above 50 weight percent, the consumption improved and for concentrations less than 50 weight percent the anode consumption per pound of chlorine decreased.

It was also noted that the average cell voltage was related to the amount of pitch or tar used in the impregnant. The average cell voltage increasing as the concentration of pitch or tar increases and decreasing as the amount of tarry hydrocarbon decreases.

While improved consumption is a benefit, the higher cell voltage reflects more costly power requirements. Ratios of hydrocarbon to furfural of about 50:50 and 40:60 represent optimum overall characteristics.

To illustrate the advantageous characteristics of tarry hydrocarbon impregnated anodes a series of tests were conducted in which the grams of graphite consumed per hour during normal operation of a chlorine cell was measured for unimpregnated anodes, linseed oil impregnated anodes and anodes impregnated is herein described. Table I contains values which represent the average of twenty anodes of each type. All samples were prepared from the same base graphite.

TABLE I

| Material | Consumption (grams of graphite consumed/ thousand ampere hours) | Percent improvement over plain graphite |
|---|---|---|
| (1) Plain graphite anode | 15.68 | |
| (2) Linseed oil impregnated anode | 8.45 | 46.11 |
| (3) Furfuraldehyde, tarry hydrocarbon catalyst impregnated anode | 5.89 | 62.43 |

What is claimed is:

1. As an article of manufacture a graphite anode impregnated with a curable impregnant for lowering the permeability of carbon and graphite articles comprising a tarry hydrocarbon, furfural and an acid catalyst.

2. An article in accordance with claim 1 wherein the said catalyst is between about 0.5 and about 10%.

3. A carbonaceous anode impregnated with a thermosetting impregnant which is liquid at room temperature comprising from 10 to 80 weight percent of a tarry hydrocarbon, furfural and an acid catalyst capable of providing for thermosetting of the impregnant upon heating to elevated temperatures.

4. An article in accordance with claim 3 wherein said catalyst is a material selected from the group consisting of diethyl sulfate, benzene sulfonyl chloride, toluene sulfonyl chloride, methyl toluene sulfonate, phthalic anhydride and para toluene sulfonic acid.

5. An article according to claim 3 wherein the thermosetting impregnant comprises about equal parts of furfural and coal tar pitch.

6. An article according to claim 3 wherein the thermosetting impregnant comprises about equal parts of furfural and coal tar.

7. A process for reducing the permeability of carbon and graphite electrolytic anodes comprising the steps of impregnating the anode with a thermosetting impregnant containing a tarry hydrocarbon, furfural, and a catalytic quantity of an acid catalyst; removing excess impregnant and curing said thermosetting impregnant at a temperature below its decomposition temperature.

8. A process for reducing the permeability of carbon and graphite electrolytic anodes which comprises the steps of impregnating the anode with a thermosetting impregnant containing from 10 to 80 weight percent of a tarry hydrocarbon, furfural and from 0.5 to about 10 weight percent of an acid catalyst; removing excess impregnant from the surface of the anode and curing the thermosetting impregnant at temperatures below its decomposition temperature.

9. A process for reducing the permeability of carbon and graphite electrolytic anodes which comprises impregnating the anode with a thermosetting impregnant consisting essentially of from 40 to 50 weight percent of a tarry hydrocarbon, from 50 to 60 weight percent furfural and from 3 to 10 percent of an acid catalyst based on the weight of tarry hydrocarbon and furfural; removing excess impregnant from the surface of the anode and curing the thermosetting impregnant at a temperature below the decomposition temperature of the impregnant.

10. The process of claim 9 wherein said tarry hydrocarbon is coal tar pitch and said acid catalyst is diethyl sulfate.

11. The process of claim 9 wherein said tarry hydrocarbon is pitch and said acid catalyst is diethyl sulfate.

12. The process of claim 9 wherein said acid catalyst is selected from the group consisting of diethyl sulfate, phthalic anhydride, para toluene sulfonic acid, benzene sulfonyl chloride, toluene sulfonyl chloride, and methyl toluene sulfonate.

References Cited

UNITED STATES PATENTS 3,046,216   7/1962   Lowe _____ 204—294
2,174,887   10/1939   Kiefer _____ 117—121

FOREIGN PATENTS 880,693   10/1961   Great Britain.

WILLIAM L. JARVIS, *Primary Examiner.*